Oct. 4, 1932.  H. L. TURNEY  1,881,302
HOISTING ENGINE
Filed Sept. 22, 1930  3 Sheets-Sheet 1
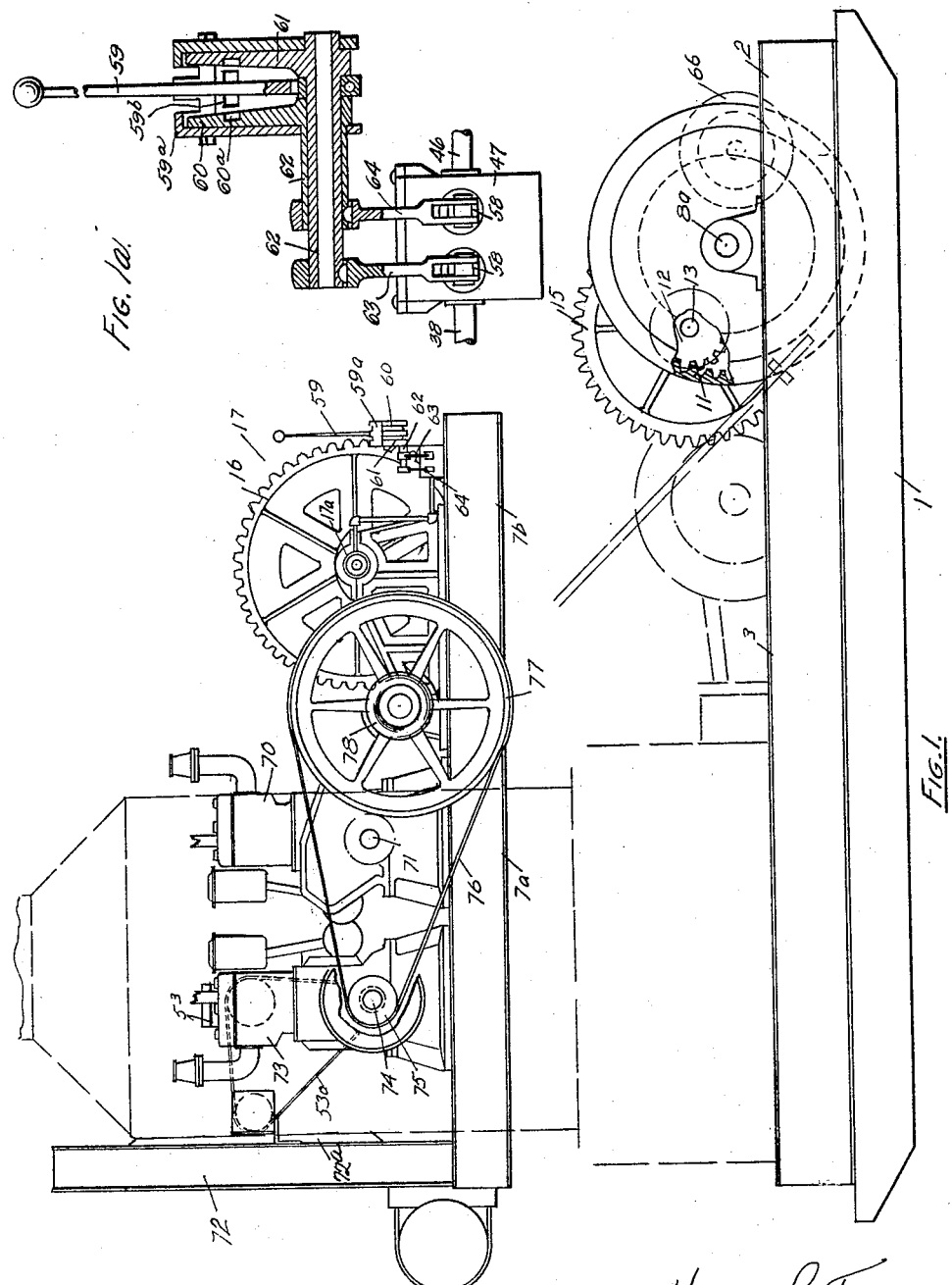

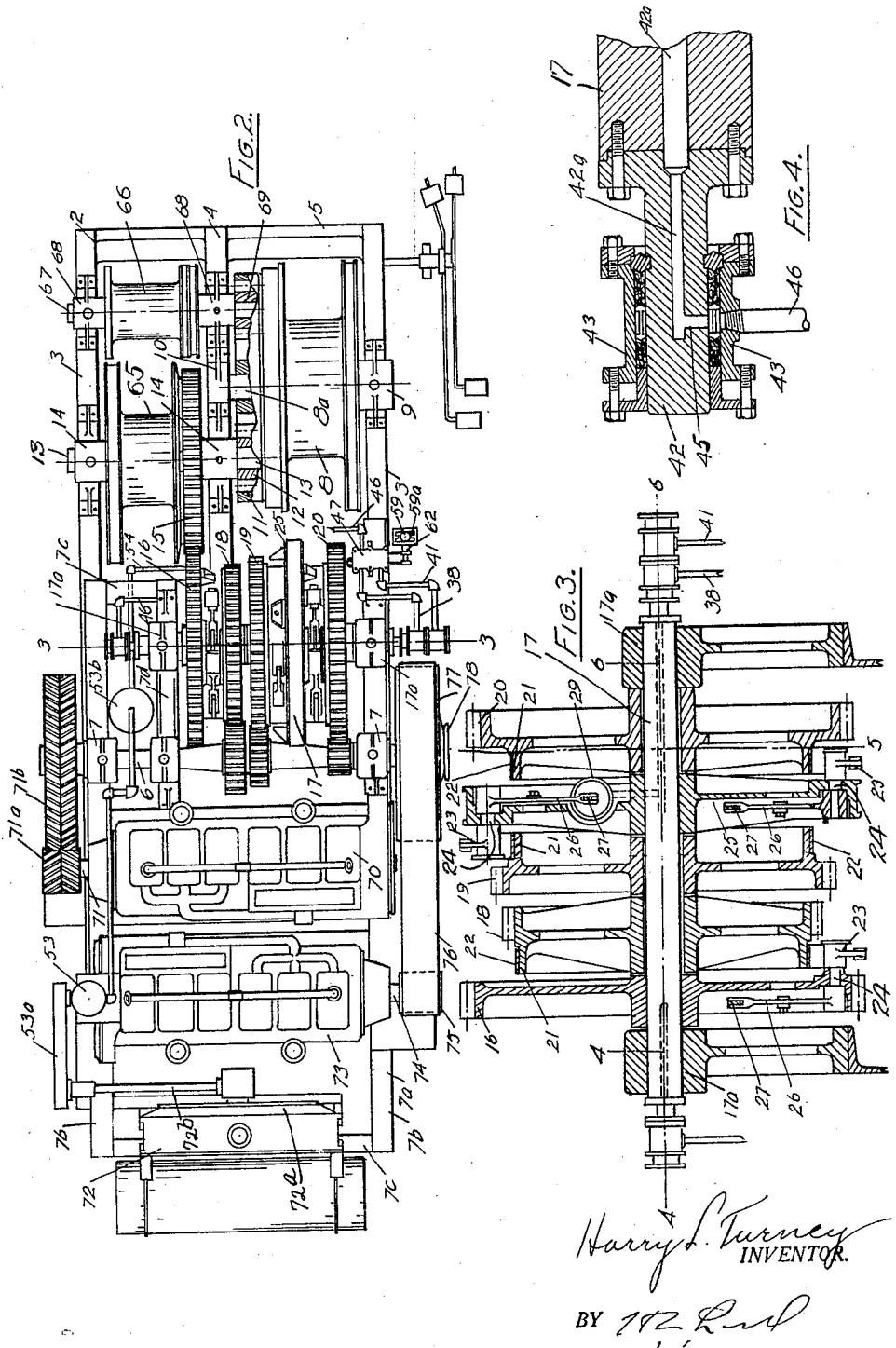

Oct. 4, 1932.  H. L. TURNEY  1,881,302
HOISTING ENGINE
Filed Sept. 22, 1930  3 Sheets-Sheet 3

Harry L. Turney
INVENTOR.

BY
ATTORNEYS.

Patented Oct. 4, 1932

1,881,302

UNITED STATES PATENT OFFICE

HARRY L. TURNEY, OF PORTLAND, OREGON, ASSIGNOR TO PATENTS & ROYALTIES CORPORATION, A CORPORATION OF CALIFORNIA

HOISTING ENGINE

Application filed September 22, 1930. Serial No. 483,441.

Hoisting engines, such as logging engines have, in a large measure, heretofore been provided with steam power. This gave a great deal of flexibility to these devices and was, so far as the operation is concerned, quite desirable, but the draw-backs with relation to fuel and water for this apparatus more than off-set the advantages incident to the steam power. As a consequence, efforts have been made to provide logging engines with internal combustion engines and to give to such engines the necessary flexibility for successful operation. There are in consequence of the former development a very large number of logging engines having their steam plants in rather poor condition and with the disadvantages of the steam plant. The present invention provides a means whereby this large number of existing logging engines may be readily converted to one powered by the internal combustion engine. This is of particular advantage because in most instances the drum system will out-wear the power system, or steam engine in its equipment. In the preferred embodiment of my invention I provide an internal combustion engine system and a power transmission system having the necessary speeds to give the system flexibility and arrange this and mount it as a unit in a form adaptable to be placed as a unit on the frame of a logging engine in the place of a removed steam plant so that with this mere substitution the logging engine is ready to function as an internal combustion unit.

For many purposes it is desirable not only to add to the flexibility by speed changing devices, but also by a plurality of power plants and in the present invention this is accomplished by arranging separate internal combustion engines and connecting them with the power shaft. In carrying out the invention also it has been found desirable to place this internal combustion engine having a plurality of operating cylinders with its power shaft crosswise of the engine and consequently parallel with the majority of the working shafts of the logging engine. In the present invention both power units are so arranged.

Features and details of the invention will appear from the specification and claims.

A preferred embodiment of the invention is illustrated in the accompanying drawings as follows:—

Fig. 1 shows a side elevation of hoisting engine with the power unit lifted from the main frame and with the steam engine unit indicated in dash lines.

Fig. 1ᵃ is a section showing a valve controlling lever mechanism.

Figure 5:
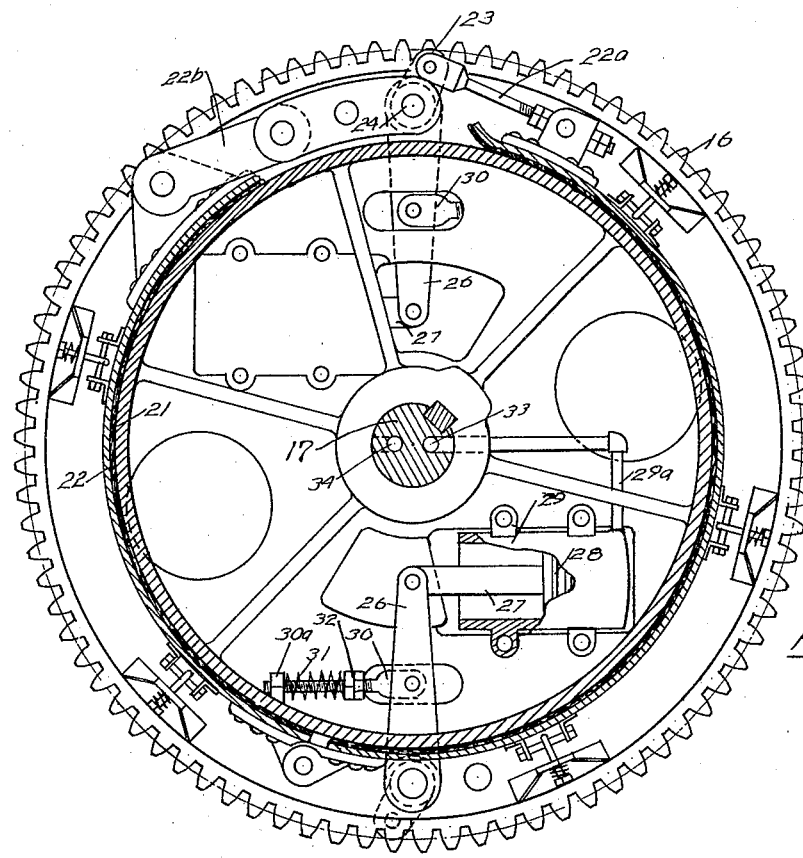
Figure 6:
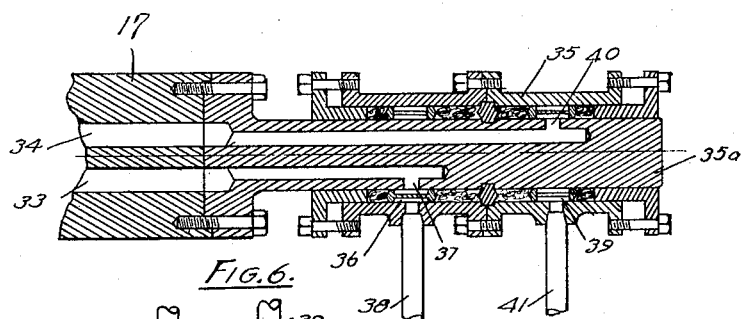
Figure 7:
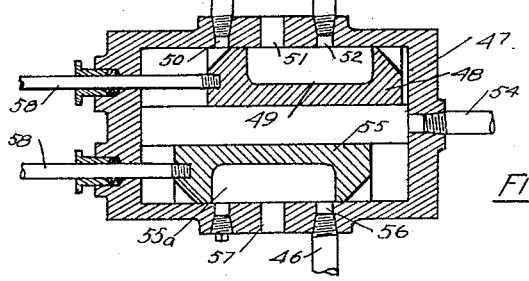

Fig. 2 a plan view of the hoisting engine.
Fig. 3 a section on the line 3—3 in Fig. 2.
Fig. 4 a section on the line 4—4 in Fig. 3.
Fig. 5 a section on the line 5—5 in Fig. 3.
Fig. 6 a section on the line 6—6 in Fig. 3.
Fig. 7 a sectional view of the controlling valve of the speed-changing device.

1 marks the skids on which the engine is mounted, and 2 the main frame. This main frame is made up of the ordinary construction adapted to handle a steam power unit and involves the side beams 3, 3, the central beam 4, and cross beams 5. The power unit delivers the power to a power shaft 6 which is journaled in bearings 7, 7 on the auxiliary frame 7a, this auxiliary frame having side beams 7b which are spaced apart to correspond to the spacing between the side beams 3, 3 of the main frame so that all that is necessary to secure this auxiliary frame on the main frame is to secure these side beams 7b of the auxiliary frame directly to the side beams of the main frame. The side beams are connected by cross beams 7c. As these parts are usually formed of I-beams, or channels the flanges of such beams form convenient means for making the attachment. The logging engine is provided with a main drum 8. The drum is mounted on a shaft 8a. The shaft is journaled in bearings 9 and 10. An internal gear 11 is mounted on the shaft and adapted to be locked with the drum 8 by the usual clutch mechanism. The internal gear 11 is driven by a spur gear 12. The spur gear is fixed on a shaft 13 and the shaft 13 is journaled in bearings 14, 14 on the main frame. A gear 15 is fixed on the shaft 13 and this gear meshes with a gear 16 on the transmission shaft 17. The transmission shaft is journaled in bearings 17a secured on the auxiliary frame, one of the bearings being on the side frame 7a and the other of said bearings on a longitudinal beam 7d extending between two of the cross members 7c. Three gears of different diameters and intended to provide three different speeds are mounted on the shaft 17, these gears being marked 18, 19 and 20. These gears are each journaled on the shaft. A band clutch mechanism is provided for each one of these gears and adapted to lock the gear with the shaft. These band clutches are of the same type, each containing a friction ring 21 secured to the gear and a friction band 22 operating on the ring, one end of the band being secured through a link 22a with a rock arm 23. The rock arm is mounted in each instance on a shaft 24, one of the rock arms being mounted in the gear 16 and the other two rock arms in a driver 25 arranged between the gears 19 and 20. A lever 26 is fixed on the rock shaft 24 and is connected by a link 27 with a piston 28. The piston 28 is mounted in a cylinder 29. A rod 30 is secured to the rock arm 26 and extends through an ear 30a on the ring 21. A spring 31 is tensioned between the rod 30 and a shoulder 32 on the rod, the spring operating on the rock lever to loosen the friction band when pressure is released from the cylinder. Each of the cylinders is connected by pipes 29a with passages in the shaft 17, the cylinder 29 controlling the low speed gear 20 being connected with an opening 33 in the shaft, the cylinder controlling the intermediate gear 19 being connected with a passage 34 and the cylinder controlling the high speed gear 18 being connected with a passage 42a in the shaft. The shaft has a head 35a at one end on which is arranged a sleeve 35. This sleeve has an annular passage 36 connected with a port 37, which port is connected with the passage 33. The annular passage 36 communicates with a supply pipe 38, The sleeve also has an annular passage 39 which connects with a port 40 communicating with the passage 34. A supply pipe 41 leads to the annular passage 39. An extension 42 is arranged on the opposite end of the shaft 17. A sleeve 43 is journaled on this extension and communicates with a port 45 leading to the passage 42a. A supply pipe 46 communicates with the sleeve 43. A valve chest 47 is provided and the supply pipes 38, 41 and 46 lead to this valve chamber. A valve 48 of the ordinary D type has a passage 49 which is adapted to connect a port 52 leading from the supply pipe 38 with an exhaust passage 51. At the time that this port 52 is exhausting, a port 50 communcating with the supply pipe 41 is opened to the valve chest chamber and is thus receiving pressure.

Engines of this type are usually supplied with air pressure from a pump driven by the engine and in the present instance a pump 53 driven by a belt 53a is provided for this purpose. Air from this pump is conducted to a receiver 53b. The receiver is connected to the valve chest by a pipe 54. A second D valve 55 is arranged in the valve chamber and it has a port, or passage 55a connecting a port 56 with the pipe 46 leading to the control. The passage 55a is adapted to connect the port 56 with an exhaust port 57 and the valves are operated by stems 58. A lever 59 works in a guide 59a and selectively engages rock arms 60 and 61 by means of projections 59b and detents 60a. These rock arms are connected on concentric shafts 62, one within the other, these shafts having rock arms 63 and 64. The rock arms 64 and 63 are connected with the rods 58 so that the valves 55 and 48 may be operated by the lever so as to deliver air for setting the band clutches on the gears 18, 19 and 20 selectively through this single lever control. A trip line drum 65 is mounted on the shaft 13 and is adapted to be locked with the gear 15 by the usual clutch mechanism, not shown. A straw-line drum 66 is mounted on a shaft 67, the shaft being journaled in bearings 68 on the main frame. A pinion 69 is arranged on the shaft 67 and meshes with the internal gear 11 and is thus driven from said internal gear. An internal combustion engine 70 has a power shaft 71 on which a gear 71a is fixed. This gear 71a meshes with a gear 71b on the power shaft 6. The engine is provided with the usual radiator 72 and receives its fuel from any convenient source. The radiator 72 is supplied with a fan 72a, the fan being driven from a shaft 72b from the belt 53a. By placing the radiator crosswise of the frame the frame may be kept down to standard width. This is very essential because under many conditions the overall width of the machine must be kept within definite limits. A second internal combustion engine 73 has a power shaft 74 operating on a sprocket 75. This operates a chain 76 delivering power to a sprocket 77 on the power shaft 6 opposite the gear 71b. A detent clutch 78 is adapted to lock, or release the sprocket 77 on the shaft 6. By connecting these engines with the power shaft separately the cross shocks from one engine to the other are avoided and the power delivered at the opposite sides of the power shaft equalizes the strain on the power shaft and the small slack of the chain 76 takes up the shock of one engine without delivering it to the other engine. This is of considerable importance in producing a smooth-running mechanism.

With the present mechanism, it will be noted that the power unit may be readily mounted as a separate unit on an auxiliary frame and all that is necessary to connect it with the mechanism to be driven where it is substituted for a steam power unit is to line up the gears 16 and 15. With such a lining up and a mere connecting of the air control to the logging engine clutches (not shown) the apparatus is ready to run.

It will also be noted that by the arrangement of the internal combustion engines crosswise of the logging frame and with a power shaft between the engines and the transmission shaft a speed-changing device is readily provided which utilizes the space of the ordinary logging engine and arranges all the gears and power shafts in parallel, thus reducing the friction of the power transmission. By providing a second power engine and connecting it to the power shaft at the opposite side from the first engine the cross shocks from the engines can be very largely obviated. When it is desired the second power unit may be disconnected through the clutch 78 where the single unit furnishes sufficient power.

What I claim as new is:—

1. In a hoisting engine, the combination of a frame; a drum mounted on the frame with its axis crosswise of the frame; a transmission shaft extending crosswise of the frame; gear connections between the drum and the transmission shaft; a series of not less than three speed changing gears on the transmission shaft between the frame sides; a power shaft parallel with the transmission shaft; a series of speed changing gears on the power shaft continuously meshing with the speed changing gears on the transmission shaft; means selectively locking and releasing one of each speed changing gears with its shaft; and a power unit driving the power shaft, said power unit having its power producing member mounted between the frame sides, and the drum, transmission and power unit being in tandem relation.

2. In a hoisting engine, the combination of a frame; a drum mounted on the frame with its axis crosswise of the frame; a transmission shaft crosswise of the frame; gear connections between the drum and the transmission shaft; a series of speed changing gears on the transmission shaft between the frame sides; a power shaft parallel with the transmission shaft; a series of speed changing gears on the power shaft meshing with the speed changing gears on the transmission shaft; means selectively locking and releasing one of each speed changing gears with its shaft; and a power unit driving the power shaft comprising an internal combustion engine having a rotating shaft parallel with the power shaft and its cylinders between the frame sides, and the drum, transmission and engine being in tandem relation.

3. In a hoisting engine, the combination of a frame; a drum mounted on the frame with its axis crosswise of the frame; a transmission shaft crosswise of the frame; gear connections between the drum and the transmission shaft; a series of speed changing gears on the transmission shaft between the frame sides; a power shaft parallel with the transmission shaft; a series of speed changing gears on the power shaft meshing with the speed changing gears on the transmission shaft; means selectively locking and releasing one of each speed changing gears with its shaft; and a power unit driving the power shaft comprising an internal combustion engine having a plurality of cylinders arranged crosswise and between the frame sides and with the rotating shaft parallel with the power shaft, the drum, transmission and engine being in tandem relation.

4. In a hoisting engine, the combination of a frame; a drum mounted on the frame with its axis crosswise of the frame; a transmission shaft crosswise of the frame; gear connections between the drum and the transmission shaft; a series of speed changing gears on the transmission shaft; a power shaft parallel with the transmission shaft; a series of speed changing gears on the power shaft meshing with the speed changing gears on the transmission shaft; means selectively locking and releasing one of each speed changing gears with its shaft; a power unit driving the power shaft comprising two engines each comprising a rotating shaft parallel with the power shaft said engines being at the same side of the power shaft and actuating the same simultaneously; and means connecting each rotating shaft with the power shaft, the drum, transmission and engine being in tandem relation.

5. In a hoisting engine, the combination of a frame; a drum mounted on the frame with its axis crosswise of the frame; a transmission shaft crosswise of the frame; gear connections between the drum and the transmission shaft; a series of speed changing gears on the transmission shaft; a power shaft parallel with the transmission shaft; a series of speed changing gears on the power shaft meshing with the speed changing gears on the transmission shaft; means selectively locking and releasing one of each speed changing gears with its shaft; a power unit driving the power shaft comprising two internal combustion engines arranged at the same side of the power shaft, each comprising a plurality of cylinders and having a rotating shaft parallel and connected with the power shaft; and means connecting said rotating shafts with the power shaft and driving the power shaft simultaneously, the drum, transmission and power shaft being in tandem relation.

6. In a logging engine, the combination of a frame; a drum mounted on the frame with its axis crosswise of the frame; a transmission shaft crosswise of the frame; gear connections between the drum and the transmission shaft; a series of speed changing gears on the transmission shaft; a power shaft parallel with the transmission shaft; a series of speed changing gears on the power shaft meshing with the speed changing gears on the transmission shaft; means selectively locking and releasing one of each speed changing gears with its shaft; a power unit driving the power shaft comprising two internal combustion engines and arranged on the same side of the power shaft, each comprising a plurality of cylinders and having a rotating shaft parallel with the power shaft; and means connecting the rotating shafts independently and simultaneously with the power shaft, the drum, transmission and power shaft being in tandem relation.

7. In a logging engine, the combination of a frame; a drum mounted on the frame with its axis crosswise of the frame; a transmission shaft crosswise of the frame; gear connections between the drum and the transmission shaft; a series of speed changing gears on the transmission shaft; a power shaft parallel with the transmission shaft; a series of speed changing gears on the power shaft meshing with the speed changing gears on the transmission shaft; means selectively locking and releasing one of each speed changing gears with its shaft; a power unit driving the power shaft comprising two internal combustion engines and arranged on the same side of the power shaft, each comprising a plurality of cylinders and having a rotating shaft parallel with the power shaft; and means connecting the rotating shafts independently and simultaneously with the power shaft, one with a gear connection and one with a chain connection, the drum, transmission and power shaft being in tandem relation.

8. In a hoisting engine, the combination of a frame; a drum mounted on the frame with its axis crosswise of the frame; a transmission shaft crosswise of the frame; gear connections between the drum and the transmission shaft; a series of speed changing gears on the transmission shaft; a power shaft parallel with the transmission shaft; a series of speed changing gears on the power shaft meshing with the speed changing gears on the transmission shaft; means selectively locking and releasing one of each speed changing gears with its shaft; a power unit driving the power shaft comprising two internal combustion engines and arranged on the same side of the power shaft, each comprising a plurality of cylinders and having a rotating shaft parallel with the power shaft; and means connecting the rotating shafts independently and simultaneously with the power shaft, one with a gear connection and one with a chain connection, the gear connection being at the opposite end of the power shaft from the gear connection, the drum, transmission and power shaft being in tandem relation.

9. In a hoisting engine, the combination of a drum mechanism comprising a main frame, a drum mounted on the main frame, a driven gear driving said drum mounted on the main frame with its axis crosswise of the frame; and a power unit comprising an auxiliary frame, a driving gear on the auxiliary frame, said auxiliary frame being adapted for attachment as a unit to and in superposed position on the main frame with said gears in mesh, a transmission shaft on which the driving gear is mounted, a power shaft parallel with the transmission shaft, a series of transmission gears on the power shaft and transmission shaft, said transmission gears being in mesh, means for selectively locking one of each series with its shaft, and power means driving the power shaft.

10. In a hoisting engine, the combination of a drum mechanism comprising a main frame, a drum mounted on the main frame, a driven gear driving said drum mounted on the main frame with its axis crosswise of the frame; and a power unit comprising an auxiliary frame, a driving gear on the auxiliary frame, said auxiliary frame being adapted for attachment as a unit to and in superposed position on the main frame with said gears in mesh, a transmission shaft on which the driving gear is mounted, a power shaft parallel with the transmission shaft, a series of transmission gears on the power shaft and transmission shaft, said transmission gears being in mesh, means for selectively locking one of each series with its shaft, and power means driving the power shaft comprising an internal combustion engine having a rotating shaft parallel with the power shaft.

11. In a hoisting engine, the combination of a drum mechanism comprising a main frame, a drum mounted on the main frame, a driven gear driving said drum mounted on the main frame with its axis crosswise of the frame; and a power unit comprising an auxiliary frame, a driving gear on the auxiliary frame, said auxiliary frame being adapted for attachment as a unit to and in superposed position on the main frame with said gears in mesh, a transmission shaft on which the driving gear is mounted, a power shaft parallel with the transmission shaft, a series of transmission gears on the power shaft and transmission shaft, said transmission gears being in mesh, means for selectively locking one of each series with its shaft, power means driving the power shaft comprising two internal combustion engines mounted at the same side of the power shaft, each having a rotating shaft parallel with the power shaft and driving connections between the rotating shafts and the power shaft.

12. In a hoisting engine, the combination of a drum mechanism comprising a main frame, a drum mounted on the main frame, a driven gear driving said drum mounted on the main frame with its axis crosswise of the frame; and a power unit comprising an auxiliary frame, a driving gear on the auxiliary frame, said auxiliary frame being adapted for attachment as a unit to and in superposed position on the main frame with said gears in mesh, a transmission shaft on which the driving gear is mounted, a power shaft parallel with the transmission shaft, a series of transmission gears on the power shaft and transmission shaft, said transmission gears being in mesh, means for selectively locking one of each series with its shaft, power means driving the power shaft comprising two internal combustion engines mounted at the same side of the power shaft, each having a rotating shaft parallel with the power shaft, a gear connected between one of said rotating shafts and the power shaft and a chain connection between the other rotating shaft and the power shaft.

13. In a hoisting engine, the combination of a drum mechanism comprising a main frame, a drum mounted on the main frame, a driven gear driving said drum mounted on the main frame with its axis crosswise of the frame; and a power unit comprising an auxiliary frame, a driving gear on the auxiliary frame, said auxiliary frame being adapted for attachment as a unit to and in superposed position on the main frame with said gears in mesh, a transmission shaft on which the driving gear is mounted, a power shaft parallel with the transmission shaft, a series of transmission gears on the power shaft and transmission shaft, said transmission gears being in mesh, means for selectively locking one of each series with its shaft, power means driving the power shaft comprising two internal combustion engines mounted at the same side of the power shaft, each having a rotating shaft parallel with the power shaft, a gear connecting one end of one rotating shaft with the power shaft and a chain connecting the opposite end of the other rotating shaft with the power shaft.

In testimony whereof I have hereunto set my hand.

HARRY L. TURNEY.